US012509997B2

(12) United States Patent
Escure et al.

(10) Patent No.: US 12,509,997 B2
(45) Date of Patent: Dec. 30, 2025

(54) METHOD FOR CONTROLLING A GAS TURBINE ENGINE

(71) Applicant: SAFRAN AIRCRAFT ENGINES, Paris (FR)

(72) Inventors: Didier René André Escure, Moissy-Cramayel (FR); Romuald Gentils, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/833,545

(22) PCT Filed: Feb. 6, 2023

(86) PCT No.: PCT/FR2023/050152
§ 371 (c)(1),
(2) Date: Jul. 26, 2024

(87) PCT Pub. No.: WO2023/148462
PCT Pub. Date: Aug. 10, 2023

(65) Prior Publication Data
US 2025/0237153 A1    Jul. 24, 2025

(30) Foreign Application Priority Data
Feb. 4, 2022  (FR) ...................... 2201009

(51) Int. Cl.
*F01D 19/02* (2006.01)
*F01D 25/36* (2006.01)
(52) U.S. Cl.
CPC ............ *F01D 19/02* (2013.01); *F01D 25/36* (2013.01); *F05D 2220/323* (2013.01); *F05D 2260/85* (2013.01); *F05D 2270/303* (2013.01)

(58) Field of Classification Search
CPC .......... F01D 19/02; F01D 25/34; F01D 25/36; F02C 7/26; F05D 2260/85
See application file for complete search history.

(56) References Cited

U.S. PATENT DOCUMENTS

| 2016/0333736 A1* | 11/2016 | Parnin ..................... F01D 25/20 |
| 2017/0233089 A1* | 8/2017 | Zaccaria ................. F01D 19/02 60/778 |

(Continued)

FOREIGN PATENT DOCUMENTS

| EP | 3 205 834 A1 | 8/2017 |
| EP | 3 205 847 A1 | 8/2017 |

(Continued)

OTHER PUBLICATIONS

French Preliminary Search Report dated Oct. 13, 2022 in Application No. 2201009.

(Continued)

*Primary Examiner* — Scott J Walthour
(74) *Attorney, Agent, or Firm* — Sughrue Mion, PLLC

(57) ABSTRACT

A method for controlling a gas turbine engine including estimating a temperature gradient between first and second portions of a spool, comparing the estimated temperature gradient with a temperature gradient threshold, if the temperature gradient is less than the threshold, driving a drive shaft in rotation at a rotational speed varying over time according to a first profile of rotational speed variation, and if the temperature gradient is greater than the threshold, controlling the electric motor to drive the drive shaft in rotation such as to vary the rotational speed of the driveshaft according to a second profile of rotational speed variation over time so that, when the rotational speed lies within a critical interval of rotational speeds, acceleration of rotation of the drive shaft is greater than acceleration of (Continued)

rotation of the drive-shaft according to the first profile of rotational speed variation, within the same critical interval.

13 Claims, 4 Drawing Sheets

(56) References Cited

U.S. PATENT DOCUMENTS

| | | | | |
|---|---|---|---|---|
| 2017/0233103 A1* | 8/2017 | Teicholz | ............... | B64F 1/34 |
| | | | | 701/100 |
| 2017/0342908 A1 | 11/2017 | Hon et al. | | |
| 2018/0355764 A1* | 12/2018 | Clauson | ............... | F01D 21/20 |
| 2020/0240329 A1 | 7/2020 | Ansari et al. | | |
| 2021/0254545 A1* | 8/2021 | Ajami | ............... | F02C 7/36 |

FOREIGN PATENT DOCUMENTS

| | | |
|---|---|---|
| EP | 3 205 858 A1 | 8/2017 |
| EP | 3 415 729 A1 | 12/2018 |

OTHER PUBLICATIONS

International Search Report dated May 26, 2023 in Application No. PCT/FR2023/050152.

* cited by examiner

METHOD FOR CONTROLLING A GAS TURBINE ENGINE

CROSS REFERENCE TO RELATED APPLICATIONS

This application is a National Stage of Application No. PCT/FR2023/050152 filed Feb. 6, 2023, claiming priority based on French Patent Application No. 2201009 filed Feb. 4, 2022, the contents of each of which being herein incorporated by reference in their entireties.

FIELD

The disclosure generally relates to the sphere of gas turbine engines, and more particularly to a method for controlling a gas turbine engine.

BACKGROUND

In manner known per se, gas turbine engines can be used to provide thrust to an aircraft.

When in operation, a gas turbine engine undergoes a substantially homogeneous temperature rise.

However, when a gas turbine engine is shut down, for example after the aircraft has landed at an airport, the gas turbine engine cools heterogeneously. Some components effectively cool quicker than others. If the gas turbine engine is shut down for a sufficiently long period (e.g. a day) all the engine components gradually cool until reaching the same temperature.

On the other hand, if the gas turbine engine is started after being shut down over a short period (e.g. one hour), some components such as those of the high-pressure spool still have major temperature differences/heterogeneities when the engine is restarted. These temperature differences can be the source of thermal expansion phenomena possibly leading to deformation of engine components. For example, bowing of the high-pressure rotor line may occur between the bearings thereof due to a vertical thermal gradient on these parts. Bowing of the rotor line leads to closing of the static clearance between the blades and casings, and also sets up unbalance on the rotor/offset mass. If the gas turbine engine is restarted when the high-pressure drive shaft is bowed, the static thermal situation of the engine together with dynamic response of the unbalance can cause friction between the rotor blades of the high-pressure compressor or high-pressure turbine and the casing of the high-pressure compressor or high-pressure turbine. If the rotor blades rub against the casing, this risks damaging the gas turbine engine and generating wear of the blades. Also, if the casing is coated with abradable material, this abradable material will be worn away generating increased clearance between the rotor and stator of the gas turbine engine. The result is deteriorated engine performance.

Several solutions have already been envisaged to limit these temperature heterogeneities. Document EP3205847 for example proposes using an electric motor connected to the air starter with a clutch to drive the high pressure drive shaft via a gear train of an accessory gearbox (AGB) at very low speed, below idle speed: the engine is said to be in "dry motoring" mode. With slow rotation of the engine, the temperature of the engine components can be homogenized.

It is also known from document EP3415729 to control an electric motor via a FADEC (Full Authority Digital Engine Control). The FADEC controls operating of the gas turbine engine and of the electric motor. When the FADEC is partly placed on standby, corresponding to shutdown of the aircraft, the electric motor rotates the drive shaft at reduced speed i.e. by dry motoring.

Documents EP3205834 and EP3205858 propose using computer models to predict the necessary dry motoring time of the electric motor connected to the air starter.

These known solutions are intended to homogenize the temperature of the components of the gas turbine engine, to prevent bowing of the drive shaft, by driving the shaft in rotation at low speed when the aircraft is shutdown. i.e. the gas turbine engine is switched off. However, these solutions require the aircraft be in shutdown over the period needed to obtain homogenized temperature of the components of the gas turbine engine, this requiring a certain waiting time before it is possible to restart the gas turbine engine. In addition, the prior art solutions involve the use of dedicated systems.

SUMMARY

It is one objective of the disclosure to overcome the aforementioned disadvantages, by proposing a method for controlling a gas turbine engine which limits the waiting time required before restarting the gas turbine engine.

The present disclosure in a first aspect therefore relates to a method for controlling a gas turbine engine, the gas turbine engine comprising a spool comprising a compressor, a turbine and a drive shaft, the turbine being able to drive the compressor via the drive shaft, and an electric motor able to drive the drive shaft in rotation, the control method comprising the steps of:
  a) estimating a temperature gradient between a first part of the spool and a second part of the spool;
  b) comparing the estimated temperature gradient with a predefined temperature gradient threshold; and
  c) and, if the temperature gradient is less than the predefined temperature gradient threshold, driving the drive shaft at a rotational speed varying over time according to a first profile of rotational speed variation;
  d) if the temperature gradient is greater than the predefined temperature gradient threshold, controlling the electric motor to drive the drive shaft in rotation so as to vary the rotational speed of the drive shaft according to a second profile of rotational speed variation over time such that, when the rotational speed of the drive shaft lies within a critical range of rotational speeds, an acceleration of rotation of the drive shaft is greater than an acceleration of rotation of the drive shaft according to the first profile of rotational speed variation, within the same critical range of rotational speeds.

According to advantageous, nonlimiting characteristics taken alone or in any combination:

The electric motor is a starter-generator.

The drive shaft is able to be driven in rotation about an axis of the gas turbine engine, and the estimated temperature gradient is obtained from temperature measurements taken in an upper portion of the spool of the gas turbine engine lying above the axis of the gas turbine engine, and temperature measurements taken in a lower portion of the gas turbine engine lying below the axis of the gas turbine engine, when the gas turbine engine is secured to an aircraft.

The critical interval of rotational speeds includes a rotational speed likely to generate entry into resonance of the spool, having regard to bowing of the drive shaft.

The critical interval of rotational speeds is defined between a first rotational speed threshold and a second rotational speed threshold, the first rotational speed threshold and the second rotational speed threshold being predetermined and dependent upon the gas turbine engine.

A power supplied by the electric motor to the drive shaft at step d), when the rotational speed of the drive shaft lies within the critical interval of rotational speeds, is determined from the temperature gradient.

The control method comprises a step to measure a first value of a vibration parameter of the spool, the power supplied by the electric motor additionally being determined from the first value of the vibration parameter of the spool.

The control method comprises a step to start up the gas turbine engine, and a step prior to the start-up step of the gas turbine engine at which the electric motor drives the drive shaft in rotation such that the drive shaft is driven at a rotational speed of less than 10 rpm.

The control method comprises a step to control the pressure of at least one buffer fluid film disposed between the drive shaft and a casing of the gas turbine engine.

Step d) comprises the supplying of a power by the electric motor to the drive shaft when the rotational speed of the drive shaft lies within the critical interval, a step to measure a second value of a vibration parameter of the spool and, if the second value of the vibration parameter of the spool is greater than a vibration parameter threshold, the power supplied by the electric motor to the drive shaft is reduced.

The spool is a high-pressure spool, the compressor is a high-pressure compressor, the turbine is a high-pressure turbine, and the drive shaft is a high-pressure drive shaft, and wherein the gas turbine engine additionally comprises a low-pressure spool comprising a fan, a low-pressure turbine and a low-pressure drive shaft, the low-pressure turbine being able to drive the fan via the low-pressure shaft.

In a second aspect, it is concerns a gas turbine engine comprising a spool comprising a compressor, a turbine and a drive shaft, the turbine being able to drive the compressor via the drive shaft, an electric motor able to drive the drive shaft in rotation, and a control module configured to control the gas turbine engine according to the steps of the method as previously defined.

According to advantageous, nonlimiting characteristics taken alone or in any combination:

The drive shaft is able to be driven in rotation about an axis of the gas turbine engine, and comprises at least two temperature sensors including a first temperature sensor configured to measure a first temperature at an upper portion of the spool of the gas turbine engine lying above the axis of the gas turbine engine, and a second temperature sensor configured to measure a second temperature at a lower portion of the spool of the gas turbine engine lying below the axis of the gas turbine engine, when the gas turbine engine is secured to an aircraft.

In a third aspect, it is also proposed an aircraft characterized in that it comprises the previously described gas turbine engine.

BRIEF DESCRIPTION OF THE DRAWINGS

Other characteristics and advantages of the present disclosure will become apparent on reading the following description of a preferred embodiment. This description is given with reference to the appended Figures in which.

DETAILED DESCRIPTION

Gas Turbine

Figure 1:
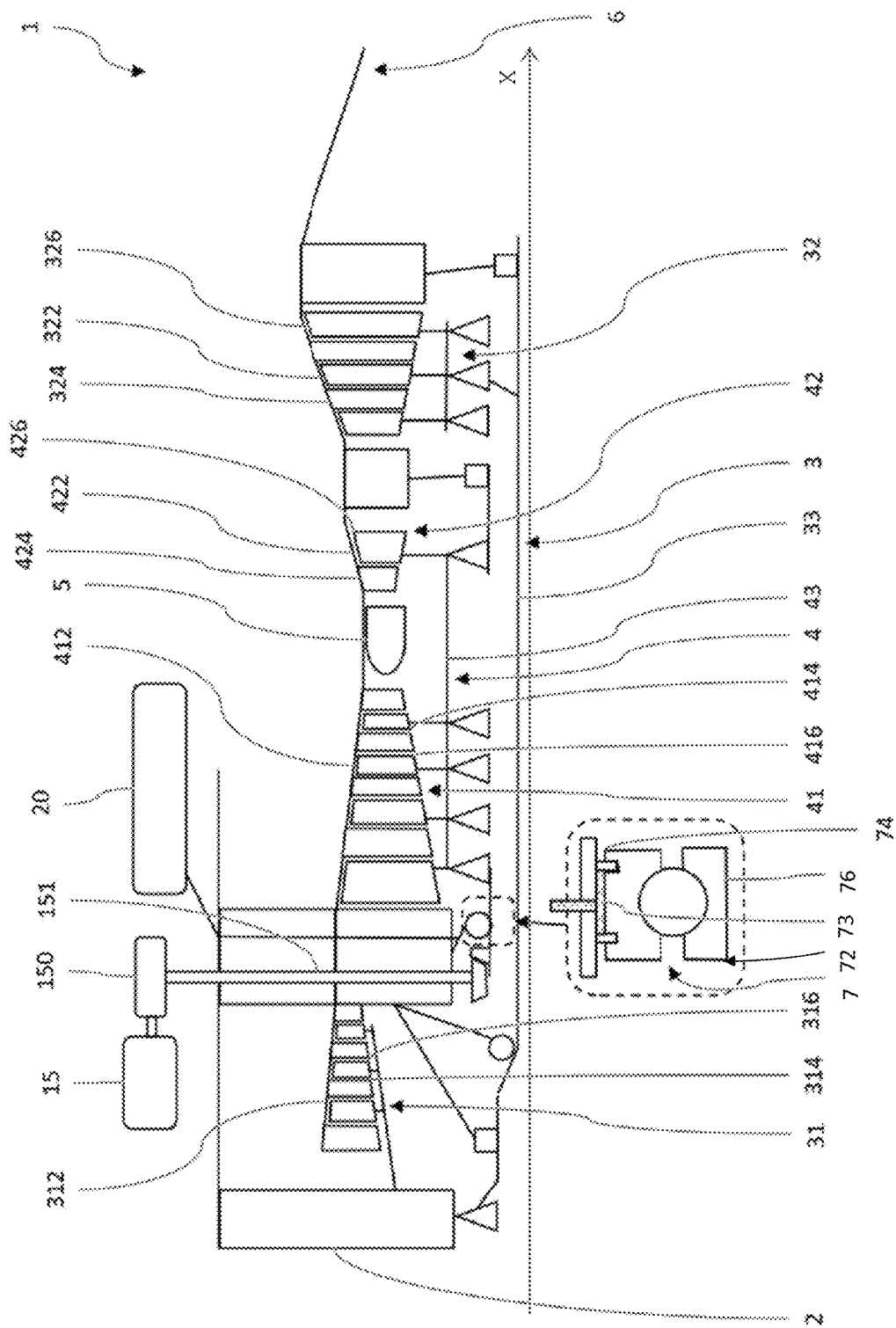
FIG. 1 schematically illustrates a gas turbine engine according to one possible embodiment.

With reference to FIG. 1, the present disclosure concerns a gas turbine engine 1 comprising a fan 2, a low-pressure spool 3, high-pressure spool 4, combustion chamber 5 and gas exhaust nozzle 6.

The high-pressure spool 4 comprises a high-pressure compressor 41, a high-pressure turbine 42 and high-pressure drive shaft 43 coupling the high-pressure turbine 42 to the high-pressure compressor 41. The low-pressure spool 3 comprises a low-pressure compressor 31, a low-pressure turbine 32 and low-pressure drive shaft 33 coupling the low-pressure turbine 32 to the low-pressure compressor 31 and extending inside the high-pressure drive shaft 43.

The high-pressure turbine 42 drives the high-pressure compressor 41 in rotation via the high-pressure drive shaft 43, while the low-pressure turbine 32 drives the low-pressure compressor 31 in rotation and the fan 2 via the low-pressure drive shaft 33.

The low-pressure drive shaft 33 is rotatably mounted about a rotation axis X parallel to a longitudinal direction of the gas turbine engine 1. Similarly, the high-pressure drive shaft 43 is rotatably mounted about the rotation axis X. The low-pressure drive shaft 33 and high-pressure drive shaft 43 are coaxial. The high-pressure drive shaft 43 extends around the low-pressure drive shaft 33.

The high-pressure compressor 41 comprises a high-pressure compressor casing 412, a high-pressure compressor stator 414 fixedly mounted relative to the high-pressure compressor casing 412, and a high-pressure compressor rotor 416 able to be driven in rotation relative to the high-pressure compressor stator 414 about the axis of rotation X. Similarly, the low-pressure compressor 31 comprises a low-pressure compressor casing 312, a low-pressure compressor stator 314 fixedly mounted relative to the low-pressure compressor casing 312, and a low-pressure compressor rotor 316 able to be driven in rotation relative to the low-pressure compressor stator 314 about the axis of rotation X.

The high-pressure turbine 42 comprises a high-pressure turbine casing 422, a high-pressure turbine stator 424, fixedly mounted relative to the high-pressure turbine casing 422, and a high-pressure turbine rotor 426 able to be driven in rotation relative to the high-pressure turbine stator 424, about the axis of rotation X. Similarly, the low-pressure turbine 32 comprises a low-pressure turbine casing 322, a low-pressure turbine stator 324, fixedly mounted relative to the low-pressure turbine casing 322, and a low-pressure turbine rotor 326 able to be driven in rotation relative to the low-pressure turbine stator 324 about the axis of rotation X.

When in operation, the fan 2 is driven in rotation by the low-pressure turbine 32, causing circulation of air from downstream to upstream of the gas turbine engine 1. Part of the air passing through the fan 2 (primary flow or primary airstream) successively passes through the low-pressure compressor 31, the high-pressure compressor 41 and is then injected into the combustion chamber 5. In the combustion chamber 5, the air is mixed with fuel. Combustion of the fuel generates exhaust gases which successively circulate through the high-pressure turbine 42, then the low-pressure turbine 32 and are evacuated via the exhaust gas nozzle 6.

Preferably, the gas turbine engine 1 comprises bearings 7 to guide the high-pressure drive shaft 43 and low-pressure drive shaft 33 in rotation. Typically, the gas turbine engine 1 comprises two bearings 7 positioned downstream of the low-pressure compressor 31, a bearing 7 upstream of the high-pressure compressor 41, a bearing 7 downstream of the high-pressure turbine 42 and finally a bearing 7 downstream of the low-pressure turbine 32. These bearings include high-pressure spool bearings 72 able to guide the high-pressure drive shaft 43 in rotation, and low-pressure spool bearings 74 able to guide the low-pressure drive shaft 33 in rotation. In general, the high-pressure spool bearings 72 comprise the bearing 7 positioned upstream of the high-pressure compressor 41 and the bearing 7 positioned downstream of the high-pressure turbine 42. Regarding the bearings 7 of the low-pressure spool 3, these comprise the two bearings 7 positioned downstream of the low-pressure compressor 31 and the bearing 7 positioned downstream of the low-pressure turbine 32. The bearings 7 are plain bearings or roller bearings. Advantageously, the bearings 7 are inserted between a casing 14 of the gas turbine engine and the drive shaft 33, 43 supported by these bearings. In other words, each bearing 7 comprises an inner ring 73 and outer ring 74, and one among the inner ring 73 and outer ring 74 is fixedly mounted on the casing 14 of the gas turbine engine, while the other among the inner ring 73 and outer ring 74 is fixedly mounted on the drive shaft 33, 43. Preferably, the outer ring 74 is attached to a bearing mount joined to the casing 14 of the gas turbine engine. More preferably, the bearing mount extends from the outer ring 74 to a flange that is fixed relative to the casing 14 of the gas turbine engine. The bearings 7 therefore form interfaces between the drive shaft 33, 43 of the gas turbine engine 1 and the casing 14 of the gas turbine engine. Preferably, a buffer fluid film 75 is disposed between a bearing 7 and the casing 14 of the gas turbine engine Preferably the buffer fluid film 75 is a lubricant film such as an oil film. In one embodiment, the oil is supplied via an oil circuit common to the bearings 7.

The gas turbine engine 1 additionally comprises an electric motor 15. The electric motor 15 is able to drive one of the drive-shafts 33, 43 in rotation. In other words, the electric motor 15 allows rotation of one of the drive shafts 33, 43 in relation to the casing 14 of the gas turbine engine. Preferably, the electric motor 15 is able to drive the high-pressure drive shaft 43 in rotation. The electric motor 15 can be directly connected to a drive shaft 33, 43 via a gear transmission or it can be connected to an accessory gearbox 150 (AGB). The accessory gearbox 150 generally comprises one or more gear trains able to be driven in rotation via mechanical transmission by means of an angle gear on the drive shaft 33, 43 and a radial transmission shaft 151 on which there are coupled different accessories such as high-pressure fuel pumps, lubricating pumps, etc. . . . The electric motor 15 can be connected to an accessory gearbox 150 itself connected to a drive shaft 33, 43 to be driven in rotation via a radial transmission shaft 151.

In one embodiment, the electric motor 15 is a starter-generator. A starter-generator is a motor, most often an electric motor, used to start up a gas turbine engine 1. In one embodiment, the starter generator 15 is an electric motor 15 able to drive one of the drive shafts 33, 43 in rotation, for example in a hybrid gas turbine engine 1. Hybrid gas turbine engines operate both via electric energy and thermal energy derived from combustion of gases in the combustion chamber 5. Preferably, the present disclosure does not involve the addition of a dedicated electric motor 15 to the gas turbine engine 1, but the use of an electric motor 15 already in place in the gas turbine engine 1. This avoids adding congestion and weight to the gas turbine engine 1, and also avoids increased manufacturing cost.

Figure 2:
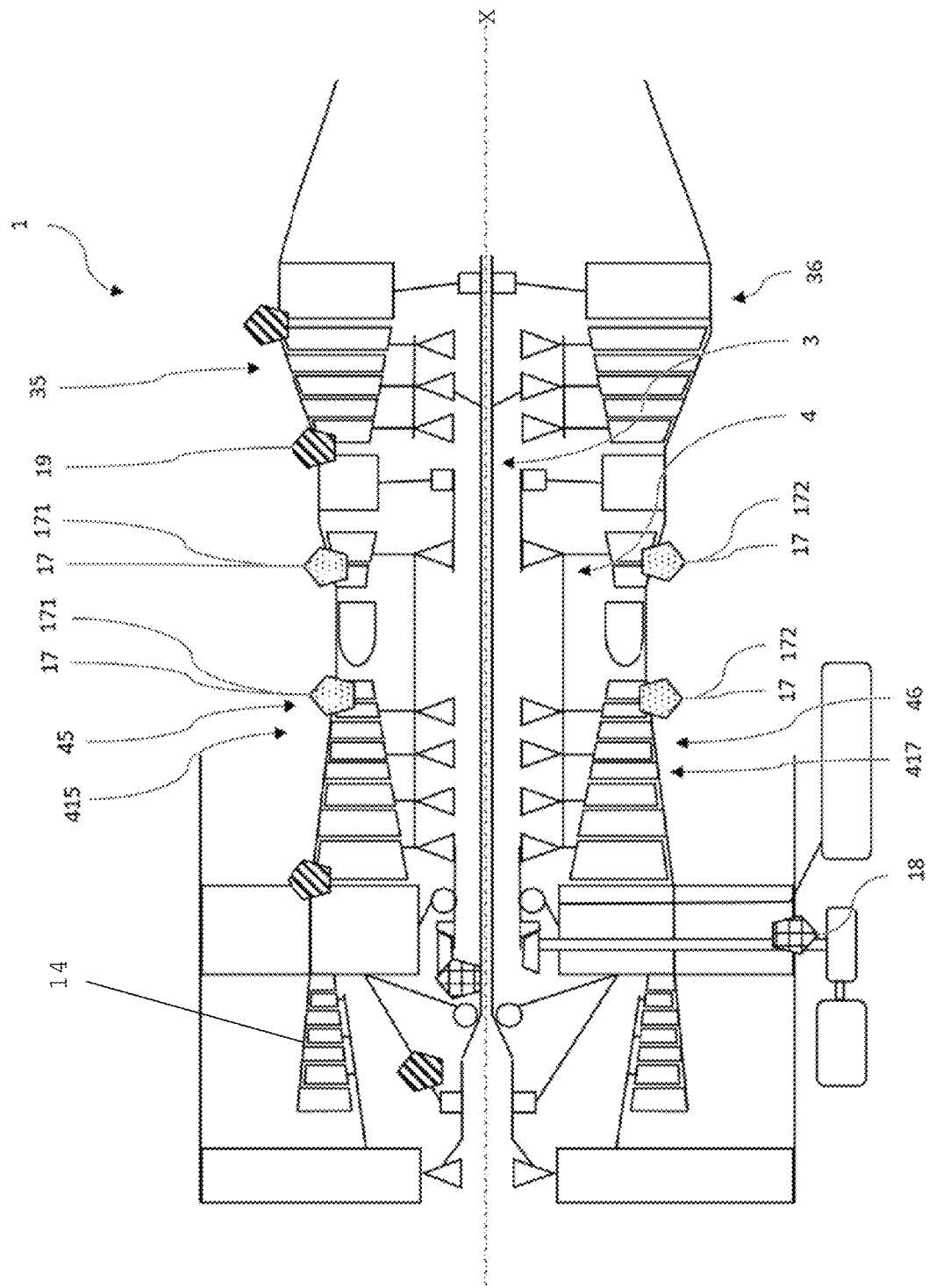
FIG. 2 schematically illustrates the position of the sensors in the gas turbine engine according to one possible embodiment.

Preferably, with reference to FIG. 2, the gas turbine engine 1 comprises at least two temperature sensors 17. The temperature sensors 17 are configured to collect data on the temperature of one of the spools 3, 4 of the gas turbine engine 1. Preferably, the temperature sensors 17 are secured to the casing 412 of the high-pressure compressor or casing 422 of the high-pressure turbine.

Preferably the two temperature sensors 17 are positioned on a casing surrounding the primary airstream at a distance of less than 20 cm and, more preferably, at a distance of less than 10 cm from the primary airstream. The temperature sensors 17 are positioned facing the high-pressure compressor 41 or high-pressure turbine 42.

Preferably, the two temperature sensors 17 comprise a first temperature sensor 171 positioned on an upper portion of the spool 35, 45 of the gas turbine engine 1, and a second temperature sensor 172 positioned on a lower portion of the spool 36, 46 of the gas turbine engine 1.

More specifically, the first temperature sensor 171 is positioned on an upper portion of the high-pressure compressor casing 412 or upper portion of the high-pressure turbine casing 422, and the second temperature sensor 172 is positioned on a lower portion of the high-pressure compressor casing 412 or high-pressure turbine casing 422. These temperature sensors 17 allow the collection of different temperature values of the gas turbine engine 1 and are used to calculate a temperature gradient between an upper portion of the spool 35, 45 of the gas turbine engine 1 and a lower portion of the spool 36. 46 of the gas turbine engine 1. The terms «upper» and «lower» are to be interpreted when considering the gas turbine engine 1 secured onto an aircraft 100, the aircraft 100 resting horizontally on the ground. In other words, a lower portion of the spool 36. 46 of the gas turbine engine 1 lies closer to the ground than an upper portion of the spool 35, 45 of the gas turbine engine 1 when the gas turbine engine 1 is secured to the aircraft 100 and the aircraft 100 rests horizontally on the ground. Preferably, the two temperature sensors 17 are positioned relative to each other at points that are diametrically opposite in relation to the axis of rotation X.

Also, advantageously, the gas turbine engine 1 comprises a rotor speed sensor 18. Preferably, the rotor speed sensor 18 is configured to measure the rotational speed of the high-pressure drive shaft 43. The rotor speed sensor 18 is attached for example to the high-pressure drive shaft 43.

Alternatively, the rotor speed sensor 18 can be attached to the radial transmission shaft 151 connected to the accessory gearbox 150. In this case, the rotational speed of the high-pressure drive shaft 43 is obtained from measurement of the rotational speed of the radial transmission shaft 151 and a gear ratio between the high-pressure drive shaft 43 and radial transmission shaft 151.

Finally, preferably, the gas turbine engine 1 comprises a vibration sensor 19. The vibration sensor 19 is configured to measure a vibration parameter of a spool 3, 4 of the gas turbine engine 1. For example, the vibration parameter is a displacement, velocity, or acceleration. This vibration parameter is expressed for example in mils DA for measurement of a vibration parameter of a low-pressure spool 3, and in inch/sec Peak for measurement of a vibration parameter of a high-pressure spool 4. The vibration sensor 19 is attached for example to a bearing mount or a flange of the low-pressure spool 3 or high-pressure spool 4. The vibration sensor 19 is therefore advantageously positioned to best capture/characterize the vibrations of the gas turbine engine 1. The position of the vibration sensor 19 may vary therefore as a function of the model of gas turbine engine 1.

Method

Figure 3:
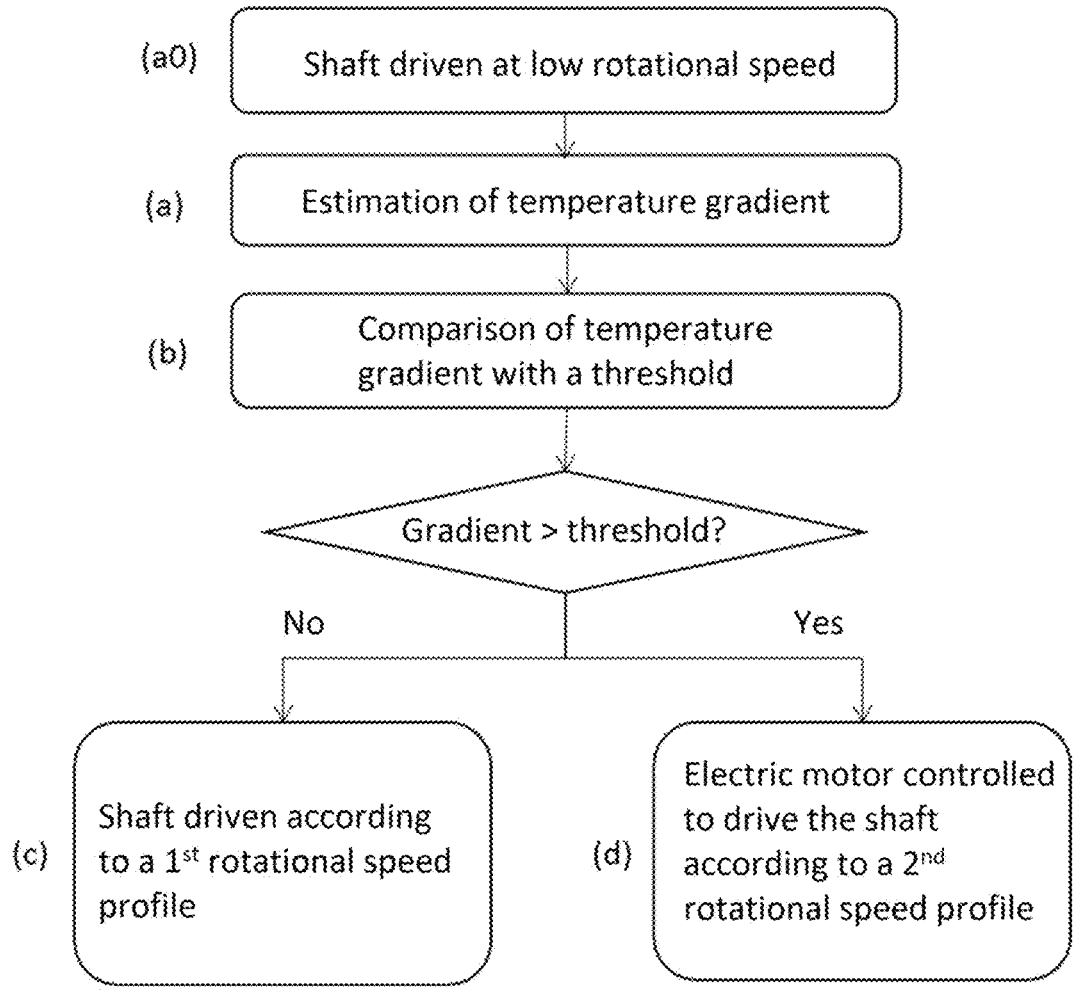
FIG. 3 schematically illustrates steps of a method for controlling a gas turbine engine according to one possible embodiment.

With reference to FIG. 3, it is described a method for controlling a gas turbine engine 1. The present method is preferably implemented before the drive shaft 33, 43 of the gas turbine engine 1 rotates at idle rotational speed. The idle rotational speed of the drive shaft 33, 43 of the gas turbine engine 1 (hereafter called «idle speed of the gas turbine engine 1» for brevity) is typically the minimal, stabilized rotational speed of the engine. The idle speed of the gas turbine engine 1 is a rotational speed of the drive shaft 33, 43 of the gas turbine engine 1 when the aircraft 100 is on the ground, either when stopped or in movement e.g. for waiting or taxiing phases. The idle speed of the gas turbine engine 1 is typically the minimum rotational speed at which the drive shaft 33, 43 of the gas turbine engine 1 rotates after start-up of the gas turbine engine 1. The start-up period of the gas turbine engine 1 is the period during which a starter-generator is needed to drive the drive shaft 33, 43 in rotation. It is therefore understood that the idle speed of the gas turbine engine 1 is the speed reached by the gas turbine engine 1 when the starter-generator is switched off (i.e. the start-up period is finished).

The method first comprises a step a) at which a temperature gradient between a first portion of the spool 35, 45 of the gas turbine engine 1 and the second portion of the spool 36, 46 is estimated. Preferably, and more specifically, the temperature gradient is a temperature gradient between the first portion of the high-pressure spool 45 (and not the first portion of the low-pressure spool 35) of the gas turbine engine 1, and the second portion of the high-pressure spool 46 (and not the second portion of the low-pressure spool 36) of the gas turbine engine 1. Preferably, the temperature gradient is obtained from at least two temperature values measured by the two temperature sensors 17 of the gas turbine engine 1 (i.e. the first temperature sensor 171 positioned on the first portion of the spool 35, 45 of the gas turbine engine 1, and the second temperature sensor 172 positioned on the second portion of the spool 36, 46 of the gas turbine engine 1). More preferably, the first portion of the high-pressure spool 45 of the gas turbine engine 1 is an upper portion of the high-pressure spool 45 of the gas turbine engine 1, and the second portion of the high-pressure spool 46 of the gas turbine engine 1 is a lower portion of the high-pressure spool 46 of the gas turbine engine 1.

Therefore, preferably, the estimated temperature gradient is obtained from temperature values measured in the upper portion of the spool 35, 45 of the gas turbine engine 1, lying above the axis of the gas turbine engine 1, and temperature values measured in the lower portion of the spool 36, 46 of the gas turbine engine 1 lying below the axis of the gas turbine engine 1 when the gas turbine engine 1 is secured to an aircraft 100. The temperature gradient is therefore obtained from at least two temperature values including a first temperature value of an upper portion of the spool 35, 45 of the gas engine turbine 1 and a second temperature value of a lower portion of the spool 36, 46 of the gas turbine engine 1. Preferably, the estimated temperature gradient is estimated from at least two temperature values including a first temperature value of an upper portion of the high-pressure spool 45 (preferably an upper portion 415 of the high-pressure compressor) and a second temperature value of a lower portion of the high-pressure spool 46 (preferably a lower portion 417 of the high-pressure compressor). Therefore, the estimated temperature gradient advantageously represents the variation in temperature between the upper portion 45 of the high-pressure spool and lower portion of 46 of the high-pressure spool. On shutdown of the gas turbine engine 1, the temperature of the spools 3, 4 of the gas turbine engine 1 becomes heterogeneous. It is in particular the temperature of the high-pressure spool 4 which becomes heterogeneous. When the gas turbine engine 1 is in operation, the high-pressure spool 4 is much hotter than the low-pressure spool 3. On cooling of the gas turbine engine 1, the lower portion 46 of the high-pressure spool cools quicker than the upper portion 45 of the higher pressure spool. This is simply accounted for by the fact that the air in a shutdown gas turbine engine becomes stratified, with the lighter hot air rising. Therefore, the air heated by the components of a cooling gas turbine engine 1 tends to rise. As a result, the upper portion of the high-pressure spool 45 is heated by hot air whilst the lower portion of the high-pressure spool 46 is less subjected to this phenomenon and consequently cools quicker than the upper portion 45 of the high-pressure spool. After a shutdown time of the gas turbine engine 1 of about one to two hours, the temperature difference between a point in the upper portion 45 of the high-pressure spool and a point in the lower portion 46 of the high-pressure spool is typically between 30 and 50 degrees. The estimated temperature gradient of the high-pressure spool 4 therefore represents the thermal heterogeneity of the high-pressure spool 4 due to this phenomenon.

Preferably, step a) of the method is implemented before or during start-up of the gas turbine engine 1. Typically, the start-up of the gas turbine engine 1 comprises the following nonlimiting steps:

Driving in rotation of the drive shaft 33, 43 of the gas turbine engine 1, preferably by the starter-generator, up to a start-up rotational speed;

Compression of ambient air by the compressors 31, 41 in rotation, and entry of compressed air into the combustion chamber 5 into which fuel is injected:

Combustion of the compressed air-fuel mixture, generating highly expanded gas flows;

The gas flows pass through the turbines 32, 42 then leave the gas turbine engine 1 via the exhaust nozzle 6, and the drive shaft 33, 43 of the gas turbine engine 1 is driven in rotation by these gas flows;

Switch-off of the starter-generator.

Start-up is completed when the gas turbine engine 1 operates independently i.e. when the drive shaft 33, 43 of the gas turbine engine 1 rotates without the need to be driven by the starter-generator. Once start-up is completed, it is considered that the gas turbine engine 1 has been started.

The temperature gradient can therefore be estimated even before start-up of the gas turbine engine 1, i.e. before the drive shaft 33, 43 of the gas turbine engine 1 is driven in rotation up to a start-up rotational speed. The temperature gradient can also be estimated during the start-up of the gas turbine engine 1. By estimating the temperature gradient before or during start-up of the gas turbine engine 1, the estimated temperature gradient represents the temperature heterogeneity of the spool 3, 4 of the gas turbine engine 1 during or after shutdown of the gas turbine engine 1.

It is to be noted that estimation of the thermal gradient can be obtained from different types of measurements of temperature values. For example, in a first embodiment, the measurements can be taken on a test bed i.e. before the gas turbine engine 1 is mounted on an aircraft and is being tested. In this case, measurement of the temperature values to estimate the temperature gradient can be performed when the gas turbine engine 1 has already been started up to determine changes in temperature heterogeneity of the spool 3, 4 of the gas turbine engine 1 during start-up, or after start-up, and after shutdown of the gas turbine engine 1. In a second embodiment, measurements of temperature values are performed on a fleet i.e. when the gas turbine engine 1 is mounted on an aircraft and the aircraft is in use. Temperature measurements are therefore performed under «real conditions», i.e. under conventional conditions of use of a gas turbine engine 1. In this case, the temperature values are captured before and during the initial moments when the drive shaft 33, 43 of the gas turbine engine 1 is set in rotation, up until a time t (less than 5 min, preferably less than 1 min, more preferably less than 15 seconds) and, as a function of the gradient estimated from these measurements, the variation profile is chosen according to step b). Time t is a function of speed and mode position. In a third embodiment, the temperature measurements are taken on a digital twin of the gas turbine engine 1, hence in simulated fashion. In other words, the present method can be implemented on a gas turbine engine 1 under different conditions (test bed, fleet, simulation . . . ) that are not limited to the present description.

Next, at step b), the temperature gradient is compared with a predefined temperature gradient threshold. The predefined temperature gradient threshold corresponds to a temperature gradient of a spool 3, 4 of the gas turbine engine 1, on and after which bowing of the drive shaft 33, 43 of the gas turbine engine 1 occurs, and driving in rotation of the drive shaft 33, 43 will cause degradation of the gas turbine engine 1. Here, the drive shaft 33,43 concerned is preferably the high-pressure drive shaft 43. More specifically, the predefined temperature gradient threshold corresponds to a temperature gradient of the spool 3 or 4 of the gas turbine engine 1 on and after which the drive shaft 33, 43 is bowed, with the result that when it is driven in rotation it enters into vibration to the extent of causing degradation of the gas turbine engine 1. In other words also, the temperature gradient threshold corresponds to a temperature gradient of the spool 3, 4 of the gas turbine engine 1 on and after which the drive shaft 33 43 is bowed with the result that when it is driven in rotation it is likely to generate entry into resonance of the spool 3 or 4, leading to degradation of the gas turbine engine 1. Therefore, the temperature gradient threshold is associated with bending of a drive shaft 33, 43, bending on and after which it is estimated that the drive shaft 33, 43 will be bowed to the extent of generating degradation of the gas turbine engine 1. Consequently, the estimated temperature gradient allows determining of estimated bending of the drive shaft 33, 43, for example a bend radius. More specifically, the estimated temperature gradient allows determination of a deflection value i.e. a maximum displacement value of the drive shaft 33, 43. This deflection value is used to determine bending of the drive shaft 33, 43. Therefore the temperature gradient allows determining of the point at which the drive shaft 33, 43 will be bowed. Preferably, a model is used to determine bending of the drive shaft 33, 43 as a function of the estimated temperature gradient. By comparing the estimated temperature gradient with the temperature gradient threshold, it is possible to determine whether the drive shaft 33, 43 is bowed to the extent that degradation of the gas turbine engine 1 will occur.

Figure 4:
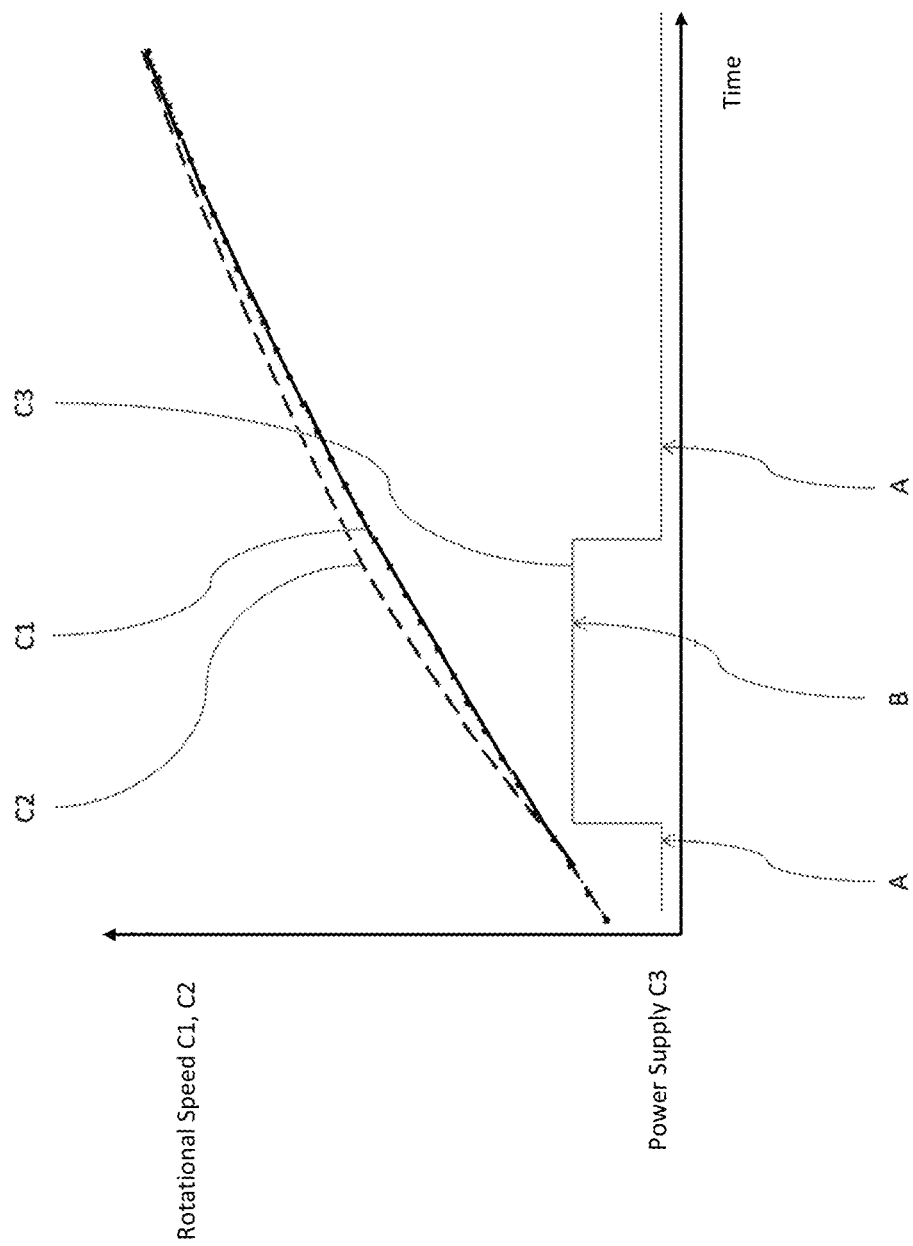
FIG. 4 is a diagram schematically illustrating a rotational speed of a drive shaft of the gas turbine engine, acceleration of drive shaft rotation as a function of time, according to two different control methods of the gas turbine engine, and a profile of power supply by the electric motor to the drive shaft.

If the estimated temperature gradient is less than the predefined temperature gradient, at step c), the drive shaft 33, 43 is driven in rotation at a rotational speed varying over time according to a first profile of rotational speed variation. The first profile of rotational speed variation is a conventional profile of rotational speed variation to reach the idle rotational speed of the drive shaft 33, 43. If the temperature gradient is less than the predefined temperature gradient threshold, it is estimated that the drive shaft 33, 43 is not bowed to the extent that it is likely to generate entry into resonance of the spool 3, 4, since the spool 3, 4 is sufficiently cooled and is cooled sufficiently homogeneously. As a result, the gas turbine engine 1 is controlled to operate normally i.e. in conventionally normal operation of a gas turbine engine 1. As previously explained, the present method is implemented before the gas turbine engine 1 operates at idle speed i.e. before the drive shaft 33, 43 rotates at idle rotational speed. The first profile of rotational speed variation over time is a conventional profile of rotational speed variation of a drive shaft 33, 43 before reaching idle rotational speed. Typically, the drive shaft 33, 43 is driven in rotation at a rotational speed which increases over time subsequent to acceleration applied to the drive shaft 33, 43 by the starter-generator. In general, acceleration is applied to the drive shaft 33, 43 by the starter-generator during start-up to enable the drive shaft 33, 43 to accelerate until reaching an idle rotational speed. An example of a first profile of rotational speed variation C1 is illustrated in FIG. 4. The curves C1 and C2 in FIG. 4 illustrate changes in rotational speed as a function of time.

On the other hand, if the estimated temperature gradient is greater than the predefined temperature gradient threshold, at step d), the starter-generator 15 is controlled to drive the drive shaft 33, 43 in rotation such that the rotational speed of the drive shaft 33, 43 is varied according to a second profile of rotational speed variation over time so that, when the rotational speed of the drive shaft 33, 43 lies within a critical interval of rotational speeds, acceleration of rotation of the drive shaft 33, 43 is greater than acceleration of rotation of the drive shaft 33, 43 according to the first profile of rotational speed variation within the same critical interval of rotational speeds. Degradation of the gas turbine engine 1 occurs when the rotational speed of the bowed drive shaft 33, 43 lies within a critical interval of rotational speeds since the drive shaft 33, 43, and hence the spool 3, 4, vibrate intensely. More particularly, if the bowed drive shaft 33, 43 rotates at a speed within the critical interval of rotational speeds, the spool 3, 4 is likely to enter into resonance. By implementing step d), the drive shaft 33, 43 rotates the least time possible at a rotational speed within the critical interval of rotational speeds, which allows limited degradation to the gas turbine engine 1. In other words, the shorter the period during which the rotational speed of the drive shaft 33, 43 lies within the critical interval of rotational speeds, the shorter the period during which the drive shaft 33, 43 vibrates intensely, and the shorter and less intense the period during which the drive shaft 33, 43 generates degradation of the gas turbine engine 1. The period during which the drive shaft 33, 43 rotates at a rotational speed within the critical interval of rotational speeds is reduced, compared with a conventional driving profile of the drive shaft 33, 43. It follows that the harmful consequences (i.e. degradation of the gas turbine engine 1) of the bowed drive shaft 33, 43 are reduced. Therefore, step d) entails controlling the electric motor 15 so that, when the rotational speed of the drive shaft 33, 43 lies within the critical interval of rotational speeds, the drive shaft 33, 43 is accelerated if the temperature gradient is greater than the temperature gradient threshold. The rotational speed of the drive shaft 33, 43 therefore varies according to a second profile of rotational speed variation over time which differs from the first profile of rotational speed variation over time. If the rotational speed of the drive shaft 33, 43 varies according to the second profile of rotational speed variation then the speed of the drive shaft 33, 43, when it lies within the critical interval of rotational speeds, increases more rapidly than if the rotational speed of the drive shaft 33, 43 varied according to the first profile. An example of a second profile of rotational speed variation C2 is illustrated in FIG. 4. If the temperature gradient is greater than the temperature gradient threshold, the drive shaft 33, 43 is accelerated by the electric motor 15 when the shaft rotational speed lies within the critical interval of rotational speeds, and this acceleration is greater than an acceleration of the drive shaft 33, 43 if the temperature gradient is less than the temperature gradient threshold. To apply this acceleration, the electric motor 15 applies power to the drive shaft 33, 43. Curve C3 in FIG. 4 illustrates this application of power. Curve C3 is a schematic binary curve (state A when no power is applied, and state B when a power is applied) which schematizes the supply of power to the drive shaft 33, 43 when the rotational speed of the drive shaft 33, 43 reaches the lower limit of the critical interval of rotational speeds.

The present method does not require a waiting time of the aircraft 100 on the tarmac until the temperature of the spool 3, 4 homogenizes, before it is possible to start up the gas turbine engine 1 of the aircraft 100. Step d) of the present method is implemented during the start-up process of the gas turbine engine 1. The control method just described therefore allows limiting of degradation of the gas turbine engine 1 caused by thermal heterogeneity of the spool 3, 4, without preventing start-up of the gas turbine engine 1.

At step d), the electric motor 15 accelerates the drive shaft 33, 43 for quicker exit from the critical interval of rotational speeds. The critical interval of rotational speeds covers all the rotational speeds included between a first rotational speed threshold and a second rotational speed threshold. The first rotational speed threshold is the lower limit of the critical interval of rotational speeds. The second rotational speed threshold is the upper limit of the critical interval of rotational speeds. As soon as the rotational speed of the drive shaft 33, 43 reaches the first rotational speed threshold, the electric motor 15 accelerates the drive shaft 33, 43 so that the drive shaft 33, 43 reaches a rotational speed greater than the second rotational speed threshold. For example, the electric motor 15 can accelerate the drive shaft 33, 43 when it rotates at a speed of 3500 rpm until the drive shaft 33, 43 reaches a speed of 7000 rpm. The rotor speed sensor 18 can detect when the drive shaft 33, 43 rotates at a rotational speed equal to the first rotational speed threshold or to the second rotational speed threshold. It is understood therefore that if the estimated temperature gradient is greater than the predefined temperature gradient threshold, the electric motor 15 accelerates the drive shaft 33, 43 as soon as the drive shaft 33, 43 rotates at a rotational speed equal to the first rotational speed threshold. Therefore, between the first rotational speed threshold and second rotational speed threshold, the rotational speed increases faster according to the second profile of rotational speed variation than according to the first profile of rotational speed variation.

The first and second rotational speed thresholds are preferably predetermined and depend upon the gas turbine engine 1. The critical interval of rotational speeds is dependent on the type (i.e. model) of the gas turbine engine 1. The rotational speed likely to generate entry into resonance of the spool 3, 4, causing degradation of the gas turbine engine 1, is dependent on the geometry of the gas turbine engine 1 and hence on the type of gas turbine engine 1. Therefore, the first and second rotational speed thresholds are predetermined for a gas turbine engine 1.

The electric motor 15 is configured to apply a power to the drive shaft 33, 43 and allows accelerated rotation of the drive shaft 33, 43. From the power applied by the electric motor 15 to the drive shaft 33, 43, there directly follows accelerated rotation of the drive shaft 33, 43 caused by the electric motor 15. More specifically, the greater the power applied by the electric motor 15 to the drive shaft 33, 43 the greater the acceleration of rotation of the drive shaft 33, 43. The power applied by the electric motor 15 to the drive shaft 33, 43 depends firstly on the electric motor 15 used. The power applied by the electric motor 15 to the drive shaft 33, 43 cannot exceed the maximum power applicable by the electric motor 15. In one embodiment, the power applied by the electric motor 15 to the drive shaft 33, 43 is fixed. For example, the electric motor 15 applies a constant power of 350 kW to the drive shaft 33, 43.

Preferably, a power supplied by the electric motor 15 to the drive shaft 33, 43 at step d), when the rotational speed of the drive shaft 33, 43 lies within the critical interval of rotational speeds, is determined from the temperature gradient. In this manner, the power supplied by the electric motor 15 to the drive shaft 33, 43 depends on the deflection of the drive shaft 33, 43 caused by the temperature gradient. The greater the temperature gradient, the greater the deflection of the drive shaft 33, 43 and the more the vibrations of the spool 3, 4 are likely to increase when the drive shaft 33, 43 rotates at a rotational speed lying within the critical interval of rotational speeds. Consequently, the greater the temperature gradient the greater the possible extent of degradation of the gas turbine engine 1. It is therefore all the more desirable that the drive shaft 33, 43 should rotate over the shortest possible period of time at a rotational speed lying within the critical interval of rotational speeds. Therefore, if there is a strong temperature gradient, it is desirable to accelerate more intensely the rotational speed of the drive shaft 33, 43 when the drive shaft 33, 43 rotates at a rotational speed within the critical interval of rotational speeds. If the temperature gradient is small, degradation of the gas turbine engine 1 will be lesser, and it is not as necessary for the drive shaft 33, 43 to rotate over the shortest time possible at a rotational speed within the critical interval of rotational speeds. To summarize, the greater the temperature gradient the greater the power to be applied to the drive shaft 33, 43 by the electric motor 15 to obtain faster acceleration of rotation of the drive shaft 33, 43 within the critical interval of rotational speeds.

In one preferred embodiment, the method comprises a step to measure a first value of a vibration parameter of the spool 3, 4, and the power supplied by the electric motor 15 is also determined from the first value of the vibration parameter of the spool 3,4. In other words, the power applied by the electric motor 15 to the drive shaft 33, 43 is determined as a function of at least one measurement of at least one vibration parameter of a spool 3, 4 of the gas turbine engine 1. On start-up of the gas turbine engine 1, the value of the vibration parameter allows estimation of the intensity of the vibrations of the spool 3, 4 when the drive shaft 33, 43 rotates at a rotational speed within the critical interval of rotational speeds. Therefore, the power supplied by the electric motor 15 to the drive shaft 33, 43 is adapted to this estimated intensity of vibrations. The reasoning here is the same as in the preceding paragraph for determining the power to be supplied by the electric motor 15 to the drive shaft 33, 43 from the temperature gradient. If it is estimated that the vibrations will be particularly intense, it is desirable to accelerate more intensely the rotational speed of the drive shaft 33, 43 when the drive shaft 33, 43 rotates at a rotational speed within the critical interval of rotational speeds Therefore, if it is estimated that the vibrations will be particularly intense, the power supplied by the electric motor 15 to the drive shaft 33, 43 must be greater than if it were estimated that the vibrations will be scarcely intense, since the drive shaft 33, 43 must be given faster acceleration to exit the critical interval of rotational speeds.

Preferably, the power supplied by the electric motor 15 to the drive shaft 33, 43 is adapted to prevent causing additional vibrations which would generate degradation of the gas turbine engine 1. Acceleration of the drive shaft 33, 43 controlled by the electric motor 15 could result in vibrations of the spool 3, 4 and hence in degradation of the gas turbine engine 1. It is therefore desirable that the intensity of vibrations due to accelerated rotation of the drive shaft 33, 43 does not exceed a vibration parameter threshold, and therefore acceleration of the drive shaft 33, 43 must not exceed a certain corresponding acceleration threshold. Consequently, when implementing step d), second values of a vibration parameter of the spool 3, 4 are measured by a vibration sensor 18 and compared with a vibration parameter threshold. In this manner, it is verified that the intensity of vibrations of the spool does not exceed the vibration parameter threshold. If a second value of a vibration parameter of the spool 3, 4 is greater than the vibration parameter threshold, the electric motor 15 is controlled to reduce the power supplied to the drive shaft 33, 43 leading to reduced accelerated rotation of the drive shaft 33, 43.

In one preferred embodiment, the method for controlling a gas turbine engine 1 comprises a step a0), prior to step a), at which the electric motor 15 drives the drive shaft 33, 43 in rotation such that the drive shaft 33, 43 rotates at a low rotational speed, lower than 10 rpm. Preferably, the rotational speed is less than 5 rpm. More preferably, the low rotational speed is less than 2 rpm. Preferably, step a0) is performed before start-up of the gas turbine engine i.e. when the gas turbine engine is shutdown. For example, step a0) is performed when the aircraft 100 is stopped on the tarmac. Step a0) allows limiting of thermal heterogenization i.e. reducing of the temperature gradient of the spool 3, 4 and hence of the drive shaft 33, 43. By remaining in rotation even when the gas turbine engine 1 has shut down, the spool 3, 4 and therefore the drive shaft 33, 43 cool more homogenously than when they are not rotating. This technique is known as «dry motoring». By combining the effect of dry motoring and acceleration of the drive shaft 33, 43 performed at step d), the harmful consequences of the bowed drive shaft 33, 43 on the gas turbine engine 1 are significantly reduced. Dry motoring allows limiting of the deflection of the drive shaft 33, 43, and acceleration of the drive shaft 33, 43 limits the time during which the bowed drive shaft 33, 43 can degrade the gas turbine engine 1.

Preferably, the method further comprises a step to control the pressure of at least one buffer fluid film 75 disposed between the drive shaft 33, 43 and the gas turbine engine casing 14. More specifically, these buffer fluid films having controlled pressure are preferably disposed between the bearings of the high-pressure spool 4 and the casing of the high-pressure spool 4. Advantageously, these buffer fluid films are lubricating layers, such as oil. The purpose of these buffer fluid films is to damp the vibrations of the drive shaft 33, 43. When the drive shaft 33, 43 vibrates, for example when it is bowed, all the components mounted on the drive shaft 33, 43 vibrate, generating degradation of the gas turbine engine 1. It is therefore desirable to damp these vibrations. The buffer fluid films between the bearings 7 and the gas turbine engine casing 14 are provided for this purpose. However, the pressure of the buffer fluid films generally varies since it depends on the rotational speed of the drive shaft 33, 43. For example, the pressure of the buffer fluid films can vary between two and eight bar. In the prior art, the buffer fluid films do not always obtain optimal damping of the vibrations of the drive shaft 33, 43. Therefore, advantageously, the pressure of the buffer fluid films is controlled. For example, the pressure can be controlled by an electric pump 20. When the buffer fluid film 75 is composed of a buffer fluid such as oil, the electric pump 20 is connected to the buffer fluid circuit to control the pressure thereof. In one particular embodiment, the electric pump 20 is connected to the buffer fluid circuit supplying buffer fluid to the buffer fluid films of the bearings of the high-pressure spool 4. The buffer fluid circuit for the buffer fluid films of the high-pressure body bearings 72 and low-pressure spool bearings 74 separate at a certain point to give a buffer fluid circuit for the buffer fluid films of the high-pressure spool bearings 72, and a buffer fluid circuit for the buffer fluid films of the low-pressure spool bearings 74. In this manner, the electric pump 20 is solely connected to the buffer fluid circuit for the buffer fluid films of the high-pressure spool bearings 72 to control the pressure of the buffer fluid films of the high-pressure spool bearings 72. By controlling the pressure of the buffer fluid films, damping of the vibrations of the drive shaft 33, 43 is adapted to the intensity of the vibrations of the drive shaft 33, 43. For example, if the vibrations intensify, it may be necessary to increase the pressure of the buffer fluid film 75 so that it is able to best absorb these vibrations. Therefore, control of pressure allows limiting of the vibrations of the drive shaft 33, 43, which can be due to the fact that the drive shaft 33, 43 is bowed. Degradation generated by these vibrations is therefore limited.

This present description refers to the spool 3, 4 and drive shaft 33, 43. Preferably the spool 3, 4 under consideration is the high-pressure spool 4 and the drive shaft 33, 43 is therefore the high-pressure drive shaft 43. As previously explained, thermal heterogenization on cooling of the gas turbine engine is greater in the high-pressure spool 4 than in the low-pressure spool 3. It is therefore the high-pressure drive shaft 43 which will most probably become bowed to the extent that the high-pressure spool 4 is likely to enter into resonance. The present method therefore particularly applies to the high-pressure spool 4.

However, the disclosure is not limited to the embodiment described and illustrated in the appended Figures. Modifications remain possible with regard to the composition of the various technical characteristics or substitution by technical equivalents, without departing from the scope of the invention.

The invention claimed is:

1. A method for controlling a gas turbine engine, the gas turbine engine comprising a spool comprising a compressor, a turbine and a drive shaft, the turbine being able to drive the compressor via the drive shaft, an electric motor able to drive the drive shaft in rotation, and a control module, the control module configured to:
   estimate a temperature gradient between a first portion of the spool and a second portion of the spool;
   compare the estimated temperature gradient with a predefined temperature gradient threshold;

if the temperature gradient is less than the predefined temperature gradient threshold, drive the drive shaft in rotation at a rotational speed varying over time according to a first profile of rotational speed variation; and if the temperature gradient is greater than the predefined temperature gradient threshold, control the electric motor to drive the drive shaft in rotation such as to vary the rotational speed of the drive shaft according to a second profile of rotational speed variation over time so that, when the rotational speed of the drive shaft lies within a critical interval of rotational speeds, acceleration of rotation of the drive shaft is greater than acceleration of rotation of the drive shaft according to the first profile of rotational speed variation over the same critical interval of rotational speeds, said critical interval of rotational speeds including a rotational speed likely to generate entry into resonance of the spool having regard to bowing of the drive shaft, the control method comprising:

estimating the temperature gradient between the first portion of the spool and the second portion of the spool;

comparing the estimated temperature gradient with the predefined temperature gradient threshold;

if the temperature gradient is less than the predefined temperature gradient threshold, driving the drive shaft in rotation at the rotational speed varying over time according to the first profile of rotational speed variation; and if the temperature gradient is greater than the predefined temperature gradient threshold, controlling the electric motor to drive the drive shaft in rotation such as to vary the rotational speed of the drive shaft according to the second profile of rotational speed variation over time.

2. The control method according to claim 1, wherein the electric motor is a starter-generator.

3. The control method according to claim 1, wherein the drive shaft is able to be driven in rotation about an axis of the gas turbine engine, and the estimated temperature gradient is obtained from temperature measurements in a portion of the spool of the gas turbine engine lying above the axis of the gas turbine engine, and from temperature measurements in a portion of the spool of the gas turbine engine lying below the axis of the gas turbine engine.

4. The control method according to claim 1, wherein the critical interval of rotational speeds is defined between a first rotational speed threshold and a second rotational speed threshold, the first rotational speed threshold and the second rotational speed threshold being predetermined and dependent on the gas turbine engine.

5. The control method according to claim 1, wherein a power supplied by the electric motor to the drive shaft, when the rotational speed of the drive shaft lies within the critical interval of rotational speeds, is determined from the temperature gradient.

6. The control method according to claim 5, further comprising measuring a first value of a vibration parameter of the spool, the power supplied by the electric motor also being determined from the first value of the vibration parameter of the spool.

7. The control method according to claim 1, further comprising starting-up the gas turbine engine and, prior to starting-up the gas turbine engine, driving, by the electric motor, the drive shaft in rotation such as to rotate the drive shaft at a rotational speed of less than 10 rpm.

8. The control method according to claim 1, further comprising controlling a pressure of at least one buffer fluid film disposed between the drive shaft and a casing of the gas turbine engine.

9. The control method according to claim 1, wherein, if the temperature gradient is greater than the predefined temperature gradient threshold, controlling the electric motor comprises supplying power by the electric motor to the drive shaft when the rotational speed of the drive shaft lies within the critical interval, measuring a second value of a vibration parameter of the spool and, if the second value of the vibration parameter of the spool is higher than a vibration parameter threshold, the power supplied by the electric motor to the drive shaft is reduced.

10. The control method according to claim 1, wherein the spool is a high-pressure spool, the compressor is a high-pressure compressor, the turbine is a high-pressure turbine and the drive shaft is a high-pressure drive shaft, and wherein the gas turbine engine additionally comprises a low-pressure spool comprising a fan, a low-pressure turbine and a low-pressure drive shaft, the low-pressure turbine being able to drive the fan via the low-pressure drive shaft.

11. A gas turbine engine, comprising a spool comprising a compressor, a turbine and a drive shaft, the turbine being able to drive the compressor via the drive shaft, an electric motor able to drive the drive shaft in rotation, and a control module configured to:

estimate a temperature gradient between a first portion of the spool and a second portion of the spool;

compare the estimated temperature gradient with a predefined temperature gradient threshold;

if the temperature gradient is less than the predefined temperature gradient threshold, drive the drive shaft in rotation at a rotational speed varying over time according to a first profile of rotational speed variation; and if the temperature gradient is greater than the predefined temperature gradient threshold, control the electric motor to drive the drive shaft in rotation such as to vary the rotational speed of the drive shaft according to a second profile of rotational speed variation over time so that, when the rotational speed of the drive shaft lies within a critical interval of rotational speeds, acceleration of rotation of the drive shaft is greater than acceleration of rotation of the drive shaft according to the first profile of rotational speed variation over the same critical interval of rotational speeds, said critical interval of rotational speeds including a rotational speed likely to generate entry into resonance of the spool having regard to bowing of the drive shaft.

12. The gas turbine engine according to claim 11, wherein the drive shaft is able to be driven in rotation about an axis of the gas turbine engine, and comprising at least two temperature sensors, including a first temperature sensor configured to measure a first temperature of a portion of the spool of the gas turbine engine, positioned above the axis of the gas turbine engine, and a second temperature sensor configured to measure a second temperature of a portion of the spool of the gas turbine engine positioned below the axis of the gas turbine engine.

13. An aircraft comprising a gas turbine engine, the gas turbine engine comprising a spool comprising a compressor, a turbine and a drive shaft, the turbine being able to drive the compressor via the drive shaft, an electric motor able to drive the drive shaft in rotation, and a control module configured to:

estimate a temperature gradient between a first portion of the spool and a second portion of the spool;

compare the estimated temperature gradient with a predefined temperature gradient threshold; and if the temperature gradient is less than the predefined temperature gradient threshold, drive the drive shaft in rotation at a rotational speed varying over time according to a first profile of rotational speed variation; and if the temperature gradient is greater than the predefined temperature gradient threshold, control the electric motor to drive the drive shaft in rotation such as to vary the rotational speed of the drive shaft according to a second profile of rotational speed variation over time so that, when the rotational speed of the drive shaft lies within a critical interval of rotational speeds, acceleration of rotation of the drive shaft is greater than acceleration of rotation of the drive shaft according to the first profile of rotational speed variation over the same critical interval of rotational speeds.

* * * * *